June 25, 1957 G. DE GELLEKE 2,796,933
CUTTER HOLDING AND ACTUATING MEANS FOR WEB-SLITTING MACHINES
Filed June 28, 1955 4 Sheets-Sheet 1
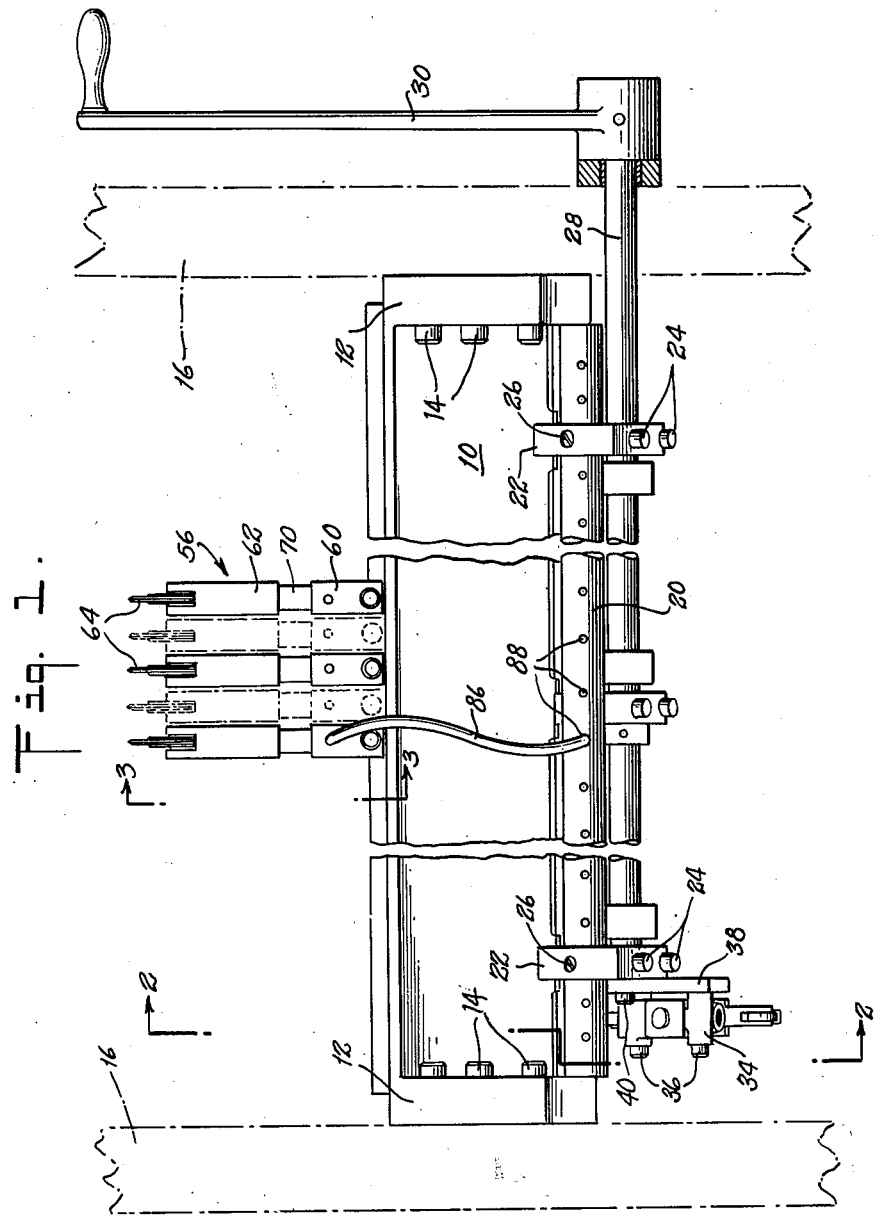
INVENTOR.
GERRIT DE GELLEKE
BY
ATTORNEY

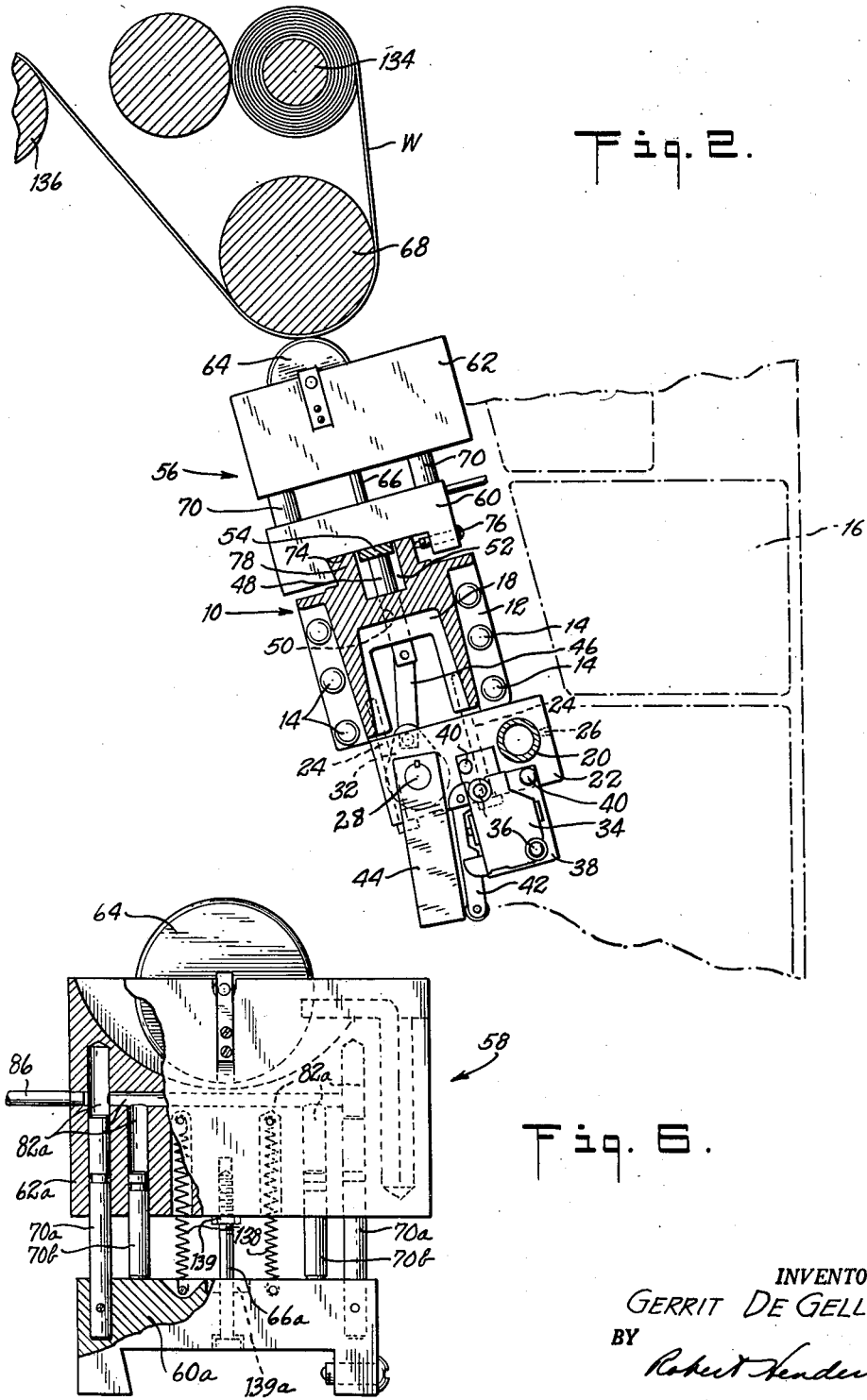

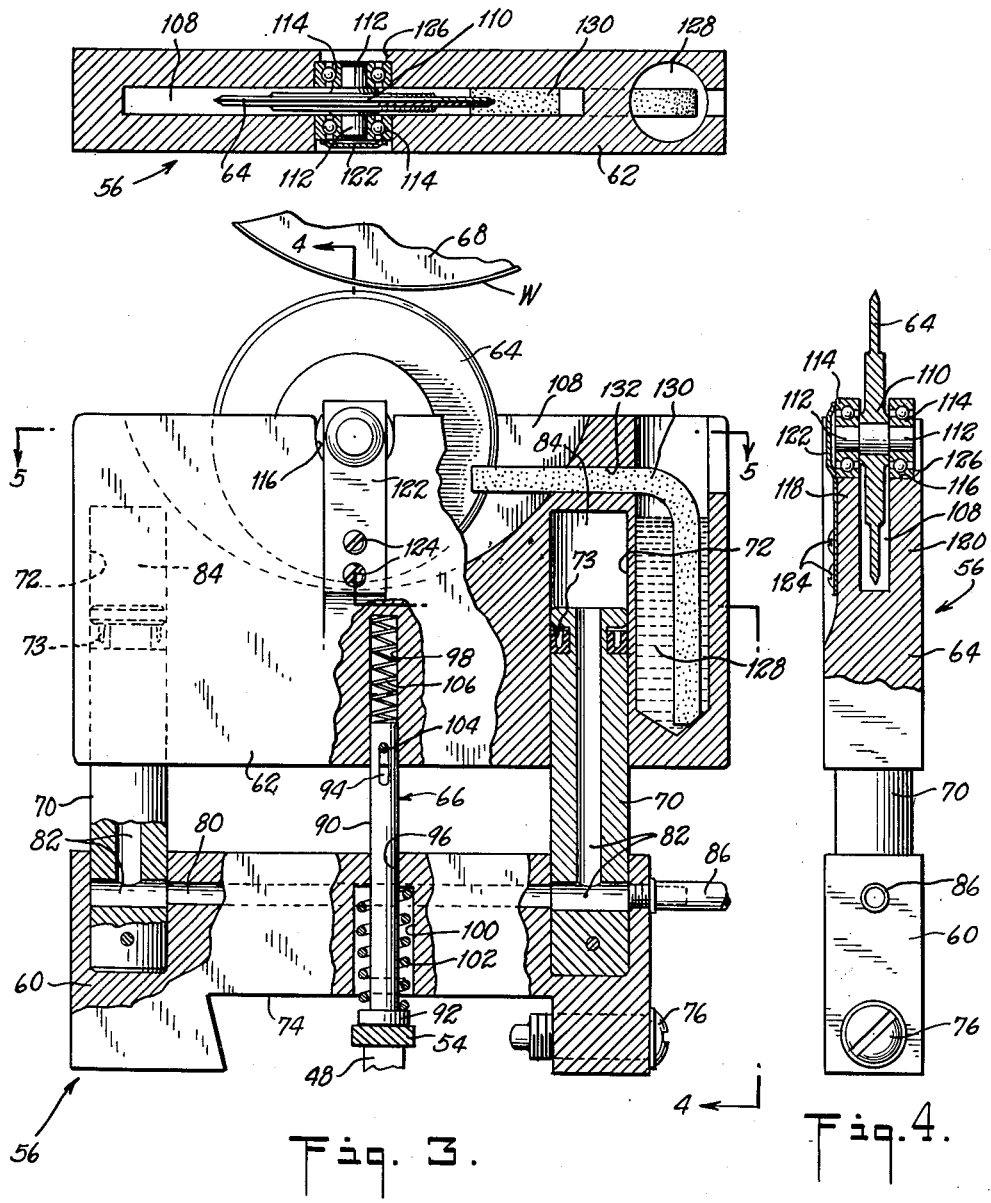

June 25, 1957         G. DE GELLEKE         2,796,933
CUTTER HOLDING AND ACTUATING MEANS FOR WEB-SLITTING MACHINES
Filed June 28, 1955         4 Sheets-Sheet 4
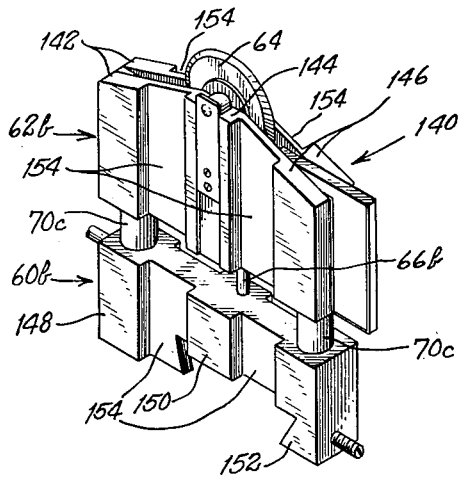
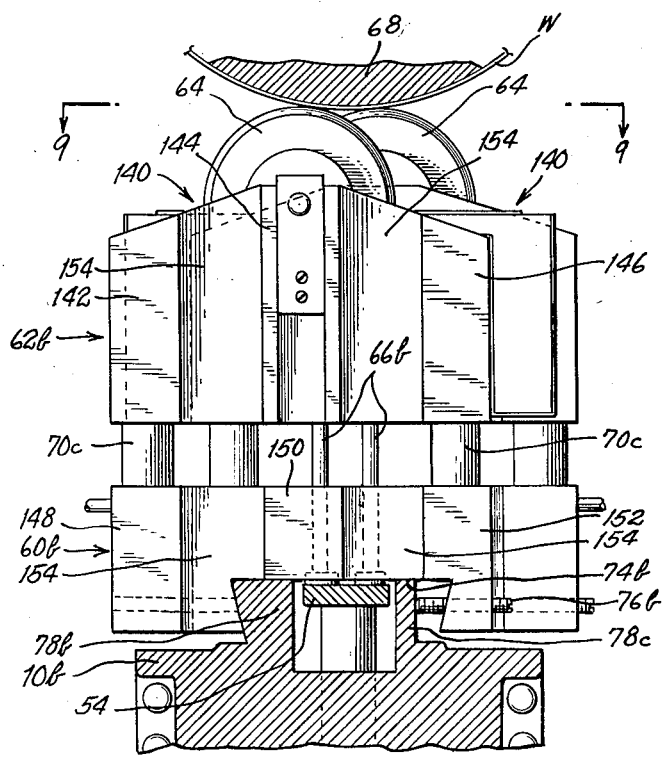
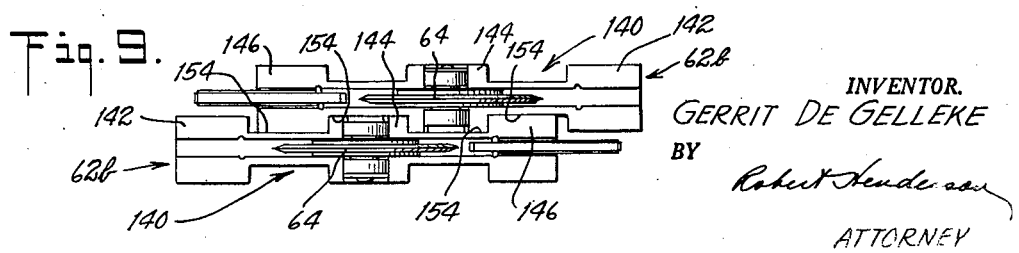
INVENTOR.
GERRIT DE GELLEKE
BY
Robert Henderson
ATTORNEY

United States Patent Office 2,796,933
Patented June 25, 1957

2,796,933
CUTTER HOLDING AND ACTUATING MEANS FOR WEB-SLITTING MACHINES

Gerrit De Gelleke, Parsippany, N. J., assignor to Cameron Machine Company, Brooklyn, N. Y., a corporation of New York Application June 28, 1955, Serial No. 518,630

26 Claims. (Cl. 164—207)

This invention relates to improvements in means by which circular cutting knives of web-slitting machines are held or supported in cutting relationship to a cutting mandrel and are advanced to and retracted from such a mandrel on occasions during the operation of the machine.

An important object of this invention is the provision of improved cutter holders which are adapted to enable the cutter to be advanced into cutting relationship to the cutting mandrel without subjecting the cuter's cuting edge or the mandrel to possible damage.

Another important object is the provision of cutter holders each including important parts of its own cutter-advancing means, which holders are supportable on a fixed holder-supporting bar or beam rather than on a holder-supporting bar which must be moved bodily to advance the holders to cutting positions, thereby enabling said supporting bar to function as a strut of the machine frame and considerably simplifying the cutter-actuating mechanism.

Another important object is the provision of cutter holders which provide straight-line advance of the cutters to cutting positions and afford support for the cutters more stable than in prior cutter holders, thereby enabling the slitting machine to maintain extremely accurate and uniform predetermined widths of the resulting slitted materials.

Another important object is the provision of relatively thin, reversible cutter holders enabling a machine, in which they are employed, to slit material to vary narrow widths.

Another important object is the provision of such cutter holders in association with operating means by which compressed air, employed to cushionedly hold the cutter, is automatically controlled by means for advancing and retracting the cutter with respect to the cutting mandrel.

The foregoing, and other important objects are accomplished by the present invention of which several embodiments are shown in the accompanying drawings for illustrative purposes without, however, limiting the invention to those particular embodiments.

In the drawings:

Figure 1 is an elevational view of preferred cutter-holding means according to this invention.

Fig. 2 is a vertical sectional view substantially on the line 2—2 of Fig. 1.

Fig. 3 is a side elevational view of an individual holder for a single circular cutter as such a holder would be viewed from the line 3—3 of Fig. 1; this view generally similar to the showing of such an individual holder in Fig. 2, but being broken away at several places to show internal parts.

Fig. 4 is a partially elevational and partly sectional view of the cutter illustrated in Fig. 3, substantially on the irregular line 4—4 of the latter figure.

Fig. 5 is a more or less horizontal view, substantially on the line 5—5 of Fig. 3.

Fig. 6 is a reduced scale view, otherwise substantially similar in its general nature to Fig. 3, but illustrating a modified form of individual cutter holder.

Fig. 7 is a perspective view of a further modified form of individual cutter holder which is reversible in a manner and for purposes heerinafter set forth.

Fig. 8 is a side elevational view of two cutter holders such as are shown in Fig. 7, mounted reversely to each other and associated with a common cutter bar and a common cutting mandrel.

Fig. 9 is a top plan view of the two cutter holders of Fig. 8 as seen from the line 9—9 of the latter figure.

Referring first to Figs. 1 and 2, the structure disclosed therein comprises a fixed, load-carrying beam 10, having end flanges 12 by which, with machine screws 14, the beam is fixed, in a horizontal position, to opposite, side, upright frame members 16 of a slitting machine; the latter members being shown only in dot-and-dash lines.

The beam 10 is generally of inverted U-shape in cross section and may, if desired, be formed with a longitudinal series of interior reinforcing webs 18, one of which is shown in Fig. 2. A tubular compressed air header 20 extends through apertures in plural header supports 22 (the number of the latter depending to some extent on the length of the header) which are similarly secured in some suitable manner to the bottom of beam 10, as, for example, by machine screws 24. The header 20 is held against shifting by set-screws 26 provided in each header support 22.

The header supports 22 and the right-side machine-frame member 16 (as viewed in Fig. 1) are provided with suitable bearing bores to oscillatably support a crank-shaft 28, provided at one end with an operating handle 30, and at at least one but preferably at several points therealong between frame members 16 are similar levers or cranks 32 which are keyed to the shaft 28 or otherwise constrained to turn with the latter.

One of the header supports 22, preferably an end one, has an air valve 34 secured thereto by screws 36 which hold said valve to a mounting plate 38 which, in turn, is secured to the one header support by screws 40. The air valve has an operating arm 42 for closing and opening it, and said valve is suitably connected by tubes or pipes (not shown) between a source of supply of compressed air and the header 20. Another arm 44 is keyed or otherwise fixed to shaft 28 to turn with the latter and actuate valve arm 42.

The levers or cranks 32 are parts of similar slack-motion take-up mechanisms which function under control of the operator of the machine to advance and retract the circular cutter relatively to the cutting mandrel. Each of these take-up mechanisms includes, in addition to lever 32, a pitman 46 pivotally connected between said lever and a plunger 48 which is slidably guided within a suitable bore 50 in beam 10. The upper ends of all these plungers extend into a longitudinal channel 52 formed in the upper side of beam 10 and are all similarly welded or otherwise fixed to a longitudinal actuating bar 54 which works up and down in channel 52 in accordance with the operation of said take-up mechanisms and serves as a common actuator for plural cutter holders, as hereinafter more fully detailed.

Along the top of beam 10 are mounted a desired number of cutter holders, the number depending on the number of strips to be formed from a web of material to be passed through the slitting machine and being limited only by the thickness of the individual cutter holders. Only five such cutter holders are indicated in Fig. 1, but it will be understood that many more, or perhaps less than five, may be used in processing a web of material. These individual cutter holders may be like holders 56 of Figs. 1–5, inclusive, or like the modified form of holder 58 shown in Fig. 6, or like the further modified form of holder 140 shown in Figs. 7, 8 and 9, or other more or less equivalent cutter holders may be used.

Referring now to the cutter holder 56, shown in detail in Figs. 3, 4 and 5, its principal parts are a base block 60, a cutter-supporting block 62 which carries a circular knife 64, and a push-rod 66, which interconnects said two blocks and functions, as hereinafter described, to advance the block 62 and knife 64 toward a cutting mandrel in the form of a roll 68 (Fig. 2) suitably supported for rotation between the machine-frame members 16; and the holder 56 further comprises a pair of air cylinders 70 fixedly seated and secured at their lower ends into base block 60 and extending upwardly, slidably, within bores 72 formed in block 62. Suitable annular packing rings 73 are provided to seal the cylinders 70 with respect to the walls of bores 72. These air cylinders also function as guides constraining the blocks 60 and 62 against relative angular movement.

The base block 60 is formed with a bottom recess 74 which is dovetail-formed at one side, and said block is provided at its other side with a locking screw 76 by tightening of which the base block 60 may be rigidly clamped to a more or less dove-tailed protuberance or ridge 78 extending longitudinally along the top of beam 10; it being understood that such cutter holders, by this means, may be secured at any desired points along said beam, depending upon the cuts desired to be made in web material to be passed through the machine.

The base block 60 also has an air passage 80, drilled or otherwise formed therein, communicating with similar air passages 82 in the air cylinders 70, which, in turn, communicate with pressure chambers 84 formed by the bores 72 within the block 62 and above the ends of said air cylinders. The air passage 80 is closed at one end, and a pipe or tube 86 is connected between its other end and one of plural ports 88 in header 20.

The push-rod 66 is formed with a stem 90 of uniform diameter, an integral flat head 92 at its lower end, and a longitudinal slot 94 toward its upper end. The stem 90 is accurately, slidably fitted within aligned bores 96 in block 60 and 98 in block 62. Block 60 is formed with a counterbore 100, below bore 96, and within said counterbore is a spring 102 which is compressed between the bottom of said counterbore and the head 92 of the push-rod. A transverse pin 104, fixed in block 62, extends through slot 94 to limit endwise movement of push-rod 66. A compression cushioning spring 106 is disposed in the bore 98 above the push-rod, and the bore 98 is suitably vented to prevent air-lock therein.

The block 62 is formed with an upwardly opening, arcuate recess 108 therein to accommodate the lower part of the circular knife 64. This knife has a hub 110 with journals 112 borne within the inner races of similar ball-bearing assemblies 114, and the outer races of the latter seat within similar, complemental semicircular seat-recesses 116 formed at the top of block 62 in side walls 118 and 120 defining the knife recess 108.

The knife with said bearing assemblies may easily be moved vertically downwardly into the recesses 108 and 116 in operating position as shown in Fig. 4, and by gravity, alone, they probably would remain in said position. However, there is preferably provided a spring cap 122 held in place on the side wall 118 by screws 124 extending through the lower part of said spring cap. The upper end of the spring cap is dished so that it engages only the outer race of adjacent ball-bearing assembly 114.

The upper end of the spring cap 122 may be manually flexed outwardly to permit the knife and its bearings to be lowered into place with the bearings in recesses 116; then the upper end of the spring cap may be released to enable it to engage the adjacent bearing and urge the knife rightwardly to a central position in its recess 108, this rightward movement being limited by an integral abutment flange 126, formed on wall 120. The frictional engagement of cap 122 and abutment flange 126 with the bearings 114 gives adequate assurance against unintended displacement of the knife.

The block 62 is formed with a lubricant well 128 from which a wick 130 extends through a bore 132 into recess 108 and into engagement with the sides of the cutting edge of knife 64.

In operation, an operator, by using handle 30, first makes sure that shaft 28 is in such position that levers 32 are clockwise of the position thereof shown in Fig. 2 to the extent of about 90° or at least sufficient that the plunger 48 is retracted as shown in full lines in Fig. 3, and push-rod 66 also is in its retracted full-line position in response to the expansive forces of springs 102 and 106. Under these conditions, the block 62 and cutter 64, because of the engagement of pin 104 with the upper end of slot 94, are held in their retracted or lowermost positions as shown in full lines in Fig. 3, leaving a substantial clearance between the cutting edge of knife 64 and cutting mandrel 68. Under these conditions, also, arm 44 is disengaged from valve-operating arm 42 so that the supply of compressed air is shut off and header 20 is connected to atmosphere.

Then, the leading edge of a web W of sheet material to be slitted may be drawn from a supply roll 134 (Fig. 2) and led between then-separated knife 64 and cutting mandrel 68 and over a guide or idler roll 136, whereafter said leading edge may be secured to a power-driven take-up roll (not shown). Thereafter, the operator, using handle 30, turns shaft 28 counterclockwisely until the levers 32 are in their positions shown in Fig. 2.

As the levers 32 move to their Fig. 2 positions, the related plungers 48 and actuating bar 54 move upwardly, pushing push-rod 66 upwardly until bar 54 engages block 60, the spring 102, meanwhile, becoming compressed. During a first part of this upward movement of said push-rod, the latter pushes block 62 and knife 64 upwardly with it due to the compressive force of spring 106 and the fact that, at the time, the upward movement of said knife is unopposed.

Before said upward movement of push-rod 66 has been completed, the knife engages the web W and, upon cutting through the web, engages the mandrel 68, whereupon upward movement of block 62 and said knife is arrested. The push-rod then continues its upward movement, at least to a slight further extent, disengaging pin 104 from the upper end of slot 94, whereupon the compressive force of spring 106 is the only force holding the knife 64 in engagement with the web W or the mandrel 68.

The angular position of arm 44 on shaft 28 and the exact angular operating position of valve arm 42 are so adjusted that, immediately following engagement of the knife with web W, and before completion of the upward movement of plunger 48, the arm 44 operates the air valve 34 to close off header 20 from atmosphere and connect it to the source of air under pressure which then becomes effective in pressure chambers 84 to hold up the block 62 and knife 64 in the latter's cutting position.

Ordinarily, the force of spring 106 would not suffice for cutting purposes, but the force generated by the air pressure in chambers 84 should suffice for all desired purposes. Thus, low air pressure may be employed if scoring of the web W, rather than slitting, is desired, and higher air pressures may be employed for cutting. Both as to scoring and cutting, the air pressure may be varied according to the nature of the web being processed. For convenience, terms such as "cutters," "cutting," "slitters," "slitting," etc., are employed in this description and in the accompanying claims as inclusive of "scorers" or "scoring."

Upon completion of the processing of one web roll, the operator merely operates handle 30 to turn shaft 28 clockwisely to retract the knife 64 in readiness for the insertion and processing of another web roll. It is understood, of course, that suitable stops, not shown, are preferably provided to limit the angular movement of the shaft 28 in opposite directions to yield the described operation.

The cutter holder of Fig. 6 differs from the structure of Figs. 3–5 chiefly in that air pipe 86 from header 20 is connected to air passages 82a located in knife-carrying block 62a and in that solid rods or rams 70a and 70b are actuated by compressed air in said passages to urge base block 60a and knife-carrying block 62a apart against the force of tension springs 138 interconnected between said blocks and normally urging them toward each other. The rods 70a are fixed at their lower ends into base block 60a and serve also to guide the relative movement of the two blocks, while rods 70b merely abut the top of block 60a. Also, push-rod 66a is threaded into the upper block 62a to permit adjustment to compensate for different degrees of wear of knife 64; a suitable lock-nut 139 being employed on said rod to lock the latter in any adjusted position and a recess 139a being provided in block 60a to receive said nut when the two said blocks closely approach each other.

When the Fig. 6 type of cutter is employed, the operation of an air valve such as valve 34 may either be controlled automatically with operation of handle 30, as already described, or said valve may be independently operated. If controlled by the handle 30, stops should be employed with crank-shaft 28 to so limit the latter's rotation that complete operation of handle 30 will move the knives 64 in the cutter holders on beam 10 to a point where the knives move very close to the web W on the mandrel 68; and the arm 44 should be so adjusted as to cause valve 34 automatically to charge air into the air chambers in block 62 (or block 62a) at the end of such complete operation of said handle to make the air pressure effective as a means for yieldably holding the cutter knives in cutting relation to the mandrel and web.

On the other hand, if independent control of the air valve is desired where cutter holders as shown in Fig. 6 are employed, the arm 44 is either omitted or rendered inoperative. In such an arrangement, the operator, by operating handle 30 and shaft 28, moves the block 62a upwardly against the tension of springs 138 until he sees that the circular knife just about touches web W. With the knife thus held, he then separately operates an air valve to charge compressed air into the passages 82a to hold the knife against said web; then, leaving the air turned on, he reverses the preceding operation of handle 30 to retract plunger 48. The compressed air maintains the knife in cutting position until the web W has been completely slitted, whereupon the operator changes the setting of the air valve to exhaust the pressure in passages 82a and permit the block 62a and knife 64 to be retracted by springs 138 in preparation for the insertion of a new web roll.

The cutter holder of Fig. 7 is disclosed to show a novel arrangement by which two or more similar cutter holders may be mounted on a beam 10b (corresponding to beam 10) in reversed positions, these holders having such adaptable mounting facilities and such side grooves that, when so reversed, the adjacent faces of the holders may complementally inter-nest so that the knives in adjacent holders may be closer to each other and cut narrower strips than would be possible with holders which are of similar widths but which lack the mentioned side grooves and such adaptable mounting facilities.

It may be observed, from Figs. 7 and 9, that the blocks 60b and 62b are thickest at the three points where two hollow air cylinders 70c and a single push-rod 66b are located. Thus, each cutter holder 140 has thickened portions 142, 144, 146 in block 62b and 148, 150, 152 in block 60b, the three said thickened portions in the one block being respectively in vertical alignment with the thickened portions in the other block. These thickened portions are separated by vertical grooves 154 in opposite sides of the two blocks.

The base block 60b should have a recess 74b which is completely dove-tailed in shape and somewhat off center as viewed in Fig. 8 and is provided with two threaded bores at opposite sides, either bore being adapted to receive a locking screw 76b so that, irrespective of the two reversed positions in which the holder 140 may be mounted on beam 10b, the locking screws of several holders may always be employed at the one side (the most accessible side) of the beam.

The two knife carriers 140 in Fig. 9 are shown in reversely facing positions with side parts of thickened portions 144 and 146 of each carrier seated within grooves 154 of the other carrier so that the planes of the cutting edges of the two knives 64, obviously, are much closer to each other than if the disclosed inter-nesting arrangement were not provided.

The knives carried by such relatively reversed holders are not in axial alignment but, as shown in Fig. 8, they are close enough to such alignment to cooperate properly with mandrel 68 and web W to properly slit the latter. The described complete dove-tail shape of the recess 74b enables the cutter holders to be thus reversely mounted on the beam 10b, and, although the push-rods 66b of such reversed holders are not in transverse alignment, they, nevertheless, are close enough to such alignment to be operated by the single longitudinal actuating bar 54.

Obviously, a considerable number of holders 140 may be employed, alternate holders being reversed, and all or some being inter-nested in relation to adjacent holders.

It should be apparent that knife holders, designed for such inter-nesting, may have the attributes previously described with reference to holders 56 or 58, or such inter-nesting may be provided in holders somewhat different from holders 56 or 58 as to the means for advancing and retracting the knives.

The provision, according to this invention, of a cutter holder mounted on a fixed beam and of straight-line reciprocability of the holder relatively to a cutting mandrel results in a very high degree of stability of the cutter so that strips can be cut either exactly to or extremely close to the desired width measurements. In contrast, prior cutter holders, which commonly are mounted upon shiftable beams and themselves are pivotal relatively to the beam, are relatively unstable because of tolerances necessary in the mounting of the beam in the machine, in several pivotal connections of the cutter holder to the beam, and in the mounting of the cutter in its holder. Although the latter arrangement may be acceptable for some types of work, it is not satisfactory for precision slitting because of insufficient stability. The present invention overcomes this difficulty.

Those at all familiar with this art will readily perceive the advantages of apparatus according to the present invention over apparatus heretofore developed for similar purposes.

It should be apparent that the present concepts may be employed in various structures other than those disclosed herein without, however, departing from the present invention as set forth in the following claims.

I claim:

1. Cutter holding and actuating means for web-slitting machines, comprising a stationary beam in parallelism to a cutting mandrel of such a machine, a cutter holder mountable on said beam in any one of plural positions therealong, guiding means for guiding said holder for straight-line reciprocation perpendicularly of said beam between an inactive position and a cutting position in which such a cutter may coact with the mandrel to cut an intervening, moving web, manually operable holder actuating means for causing such straight-line reciprocation of said holder toward and from said cutting position, and fluid-pressure-activated maintaining means for cushionedly maintaining said holder in its said cutting position.

2. Means according to claim 1, wherein said fluid-pressure-activated maintaining means are gas-pressure-activated.

3. Means according to claim 1, said holder-actuating means comprising a crank, and a pitman coacting between said crank and said holder to move the latter toward its said cutting position.

4. Means according to claim 3, wherein said fluid-pressure-activated maintaining means are gas-pressure-activated.

5. Means according to claim 1, said guiding means comprising a ram which constitutes a part of said maintaining means.

6. Means according to claim 5, wherein said fluid-pressure-activated maintaining means are gas-pressure-activated.

7. Means according to claim 1, further including control means for controlling the supply of fluid to said maintaining means, said control means being arranged to coact with said holder-actuating means to activate said maintaining means when the holder is in its said cutting position.

8. Means according to claim 7, wherein the supply of fluid is a supply of gas and said fluid-pressure-activated maintaining means are gas-pressure-activated.

9. Cutter holding and actuating means for web-slitting machines, comprising a holder adapted to hold a cutter, a stationary beam upon which said holder is reciprocably supported, means for reciprocating said holder in a straight line between an inactive position and a cutting position in which such a cutter may coact with a mandrel to cut an intervening, moving web, a first spring continuously urging said holder toward its said inactive position, a crank mechanism coacting with said holder to move the latter to its said cutting position, a second spring continuously urging said holder toward its said cutting position, enabling the cutter to yield, to avoid damage thereto, upon being brought into such cutting coaction with the mandrel upon operation of said crank mechanism, and fluid-pressure means for maintaining said holder yieldably in its said cutting position.

10. Means according to claim 9, wherein said fluid-pressure-activated maintaining means are gas-pressure-activated.

11. Means according to claim 9, including a plurality of such holders supported at plural points along said beam, a plurality of such crank mechanisms supported at plural points along said beam, and an actuating bar, extending parallel to said beam and coacting similarly with all said crank mechanisms and all said holders, to similarly actuate the latter toward their cutting positions.

12. Means according to claim 11, wherein said fluid-pressure-activated maintaining means are gas-pressure-activated.

13. A cutter holder for web-slitting machines having a beam upon which one or more of said holders may be mounted, said cutter holder comprising a base block adapted to be clamped to such a beam, a cutter-supporting block, a slidable interconnection between said blocks permitting reciprocating movement of said cutter-supporting block toward and from a cutting mandrel, a slidable push-communicating member for pushing said cutter-supporting block to slide the latter toward such a mandrel, said member having a portion extending through and exteriorly of said base block for receiving a push thereupon to communicate a push to said cutter-supporting block toward said mandrel, and said cutter holder further including fluid-pressure-activated means for maintaining said cutter-supporting block in a position wherein a cutter, supported by the latter block, is in cutting relationship to such a related cutting mandrel.

14. A cutter holder according to claim 13, wherein said fluid-pressure-activated maintaining means are gas-pressure-activated.

15. A cutter holder for web-slitting machines having a beam upon which one or more of said holders may be mounted, said cutter holder comprising a base block adapted to be clamped to such a beam, a cutter-supporting block, a slidable interconnection between said blocks permitting reciprocating movement of said cutter-supporting block toward and from a cutting mandrel, a push-communicating member, extending through said base block and being adapted to push said cutter-supporting block toward such a mandrel, and fluid-pressure-activated means for maintaining said cutter-supporting block in a position wherein a cutter, supported by the latter block, is in cutting relationship to such a related cutting mandrel, said fluid-pressure-activated means comprising a pair of rams fixed to one of said blocks and slidable within the other block, and adapted to prevent material relative angular movement of the two blocks.

16. A cutter holder according to claim 15, wherein said fluid-pressure-activated maintaining means are gas-pressure-activated.

17. A cutter holder for web-slitting machines having a beam upon which one or more of said holders may be mounted, said cutter holder comprising a base block adapted to be clamped to such a beam, a cutter-supporting block, a slidable interconnection between said blocks permitting reciprocating movement of said cutter-supporting block toward and from a cutting mandrel, a push-communicating member, extending through said base block and being adapted to push said cutter-supporting block toward such a mandrel, and fluid-pressure-activated means for maintaining said cutter-supporting block in a position wherein a cutter, supported by the latter block, is in cutting relationship to such a related cutting mandrel, said push-communicating member comprising a push-rod, a push-receiving end of which, in one relation of the two blocks, protrudes from the base block in position to be engaged by an actuating member associated with said beam.

18. A cutter holder according to claim 17, wherein said fluid-pressure-activated maintaining means are gas-pressure-activated.

19. A cutter holder for web-slitting machines having a beam upon which one or more of said holders may be mounted, said cutter holder comprising a base block adapted to be clamped to such a beam, a cutter-supporting block, a slidable interconnection between said blocks permitting reciprocating movement of said cutter-supporting block toward and from a cutting mandrel, a push-communicating member, extending through said base block and being adapted to push said cutter-supporting block toward such a mandrel, and fluid-pressure-activated means for maintaining said cutter-supporting block in a position wherein a cutter, supported by the latter block, is in cutting relationship to such a related cutting mandrel, further including resilient means between said push-communicating member and said cutter-supporting block, for cushioning the termination of the latter block's movement toward the cutting mandrel.

20. A cutter holder according to claim 19, wherein said fluid-pressure-activated maintaining means are gas-pressure-activated.

21. A cutter holder according to claim 19, said push-communicating member comprising a rod having a push-receiving end with a head thereon, the other end of said rod being slidable within a bore in said cutter-supporting block, the cutter holder further comprising a pin-and-slot connection between said rod and cutter-supporting block and a spring coacting with said head and said base block for continuously urging said blocks toward each other.

22. A cutter holder according to claim 21, wherein said fluid-pressure-activated maintaining means are gas-pressure-activated.

23. A cutter holder according to claim 15, further including additional ram means disposed substantially in a plane coincident with said pair of rams and operatively augmenting the latter.

24. A cutter holder according to claim 23, wherein said fluid-pressure-activated maintaining means are gas-pressure-activated.

25. Cutter holding and actuating means for web-slitting machines, comprising a stationary beam in parallelism to a cutting mandrel of such a machine, a cutter holder mountable on said beam in any one of plural positions longitudinally of said beam and having a cutter thereon at said holder's side which is nearest to said mandrel, said holder, further, being reciprocable toward and away from said mandrel, a manually operable rock-shaft supported adjacent to said beam and parallel thereto, a crank-pitman-and-plunger mechanism coacting with said rock-shaft and said holder for moving the latter toward the mandrel to bring said cutter into cutting relationship with the mandrel, fluid-pressure-activated maintaining means for cushionedly maintaining said holder in position with the cutter in said cutting relationship, a fluid control valve connected between said maintaining means and a source of fluid under pressure, and valve-operating means carried by and constrained to turn with said rock-shaft and adapted to operate said valve to activate said maintaining means when the cutter is in its cutting position.

26. Cutter holding and actuating means acording to claim 25, wherein said fluid-pressure-activated maintaining means are gas-pressure-activated, said fluid-control valve is a gas-control valve and the fluid in the source of fluid under pressure is gas.

References Cited in the file of this patent

UNITED STATES PATENTS

| | | |
|---|---|---|
| 223,823 | Taylor | Jan. 27, 1880 |
| 246,892 | Marshall | Sept. 13, 1881 |
| 442,878 | Geiger | Dec. 16, 1890 |
| 1,510,656 | Clements | Oct. 7, 1924 |
| 1,895,852 | Johnstone | Jan. 31, 1933 |
| 2,213,285 | Nilson | Sept. 3, 1940 |
| 2,312,173 | Johnstone | Feb. 23, 1943 |
| 2,325,431 | Shippy | July 27, 1943 |
| 2,350,375 | Stephens | June 6, 1944 |
| 2,436,656 | Marsilius | Feb. 24, 1948 |
| 2,451,359 | Schlicksupp | Oct. 12, 1948 |
| 2,492,338 | Vickers | Dec. 27, 1949 |
| 2,541,913 | Carter | Feb. 13, 1951 |
| 2,544,683 | Rogers | May 29, 1951 |
| 2,694,274 | McGibbon | Nov. 16, 1954 |
| 2,708,382 | Olson | May 17, 1955 |
| 2,712,852 | Carter | July 12, 1955 |
| 2,768,620 | Jenkins | Oct. 30, 1956 |

FOREIGN PATENTS

| | | |
|---|---|---|
| 582,188 | Great Britain | Nov. 7, 1946 |